United States Patent [19]

Brandau et al.

[11] 4,413,320

[45] Nov. 1, 1983

[54] CONTROL SYSTEM

[75] Inventors: William E. Brandau, Westwood; Frederic L. Swern, Succasunna; Kurt Moses, Dumont, all of N.J.

[73] Assignee: The Bendix Corporation, Teterboro, N.J.

[21] Appl. No.: 180,244

[22] Filed: Aug. 22, 1980

[51] Int. Cl.³ .............................................. B64C 13/18
[52] U.S. Cl. .................................... 364/428; 244/183
[58] Field of Search ................................ 364/428–430, 364/433–435; 244/183, 185, 186, 187

[56] References Cited

U.S. PATENT DOCUMENTS

| | | | |
|---|---|---|---|
| 3,059,880 | 10/1962 | Buxton | 364/428 X |
| 3,578,269 | 5/1971 | Kramer et al. | 364/428 X |
| 3,887,148 | 6/1975 | Devlin | 364/429 X |
| 3,892,373 | 7/1975 | Doniger | 364/429 X |
| 3,944,171 | 3/1976 | Boone et al. | 364/429 X |
| 3,947,809 | 3/1976 | Bateman | 364/429 X |
| 4,042,197 | 8/1977 | Boyle et al. | 244/183 |
| 4,164,340 | 8/1979 | Simpson | 364/429 X |

Primary Examiner—Edward J. Wise
Attorney, Agent, or Firm—Anthony F. Cuoco; Thomas L. Adams; Vett Parsigian

[57] ABSTRACT

A control system directs an aircraft along a predetermined curvilinear descent path (10). The aircraft carries a plurality of sensors, for example, an altitude sensor. The system has a longitudinal device (64) responsive to at least one of these sensors for providing a longitudinal signal related to longitudinal displacement of the aircraft. The system also has a height device (26) responsive to the longitudinal signal for producing a height signal functionally related to the altitude required to follow the path. Also, a command subsystem (36) responds to the height signal and a given one of the sensors to produce an error signal bearing a predetermined relation to the extent of deviation from the descent path. In one embodiment dispersion otherwise occurring during a flare maneuver is reduced by definitely directing the aircraft onto a specific path such as a circular arc. Such a control system may employ an aircraft motion monitoring system (FIG. 4) having a descending subsystem (86) responsive to at least one of the aircraft sensors for producing a descent signal signifying aircraft descent rate. Also included is an altitude differentiating device (80) for differentiating the output of the altitude sensor. Also a transfer subsystem (98, 100) produces a signal, controlling influence in its production being transferred from the descending subsystem to the altitude differentiating device in response to arrival of the aircraft at a predetermined position. The control system preferably employs another motion monitoring system (FIGS. 3 or 5) having a velocity sensing device (74, 112) providing a velocity signal signifying ground speed and a travel integrating device (62) for integrating the output of a longitudinal acceleration sensor carried by the aircraft. A feedback device (72) is coupled around the travel integrating device. This feedback device has a combinational subsystem (70, 68) responsive to the longitudinal acceleration sensor and the velocity signal for driving the travel integrating device. The foregoing motion monitoring systems can be highly reliable and can produce initial conditions which reduce transients.

33 Claims, 5 Drawing Figures

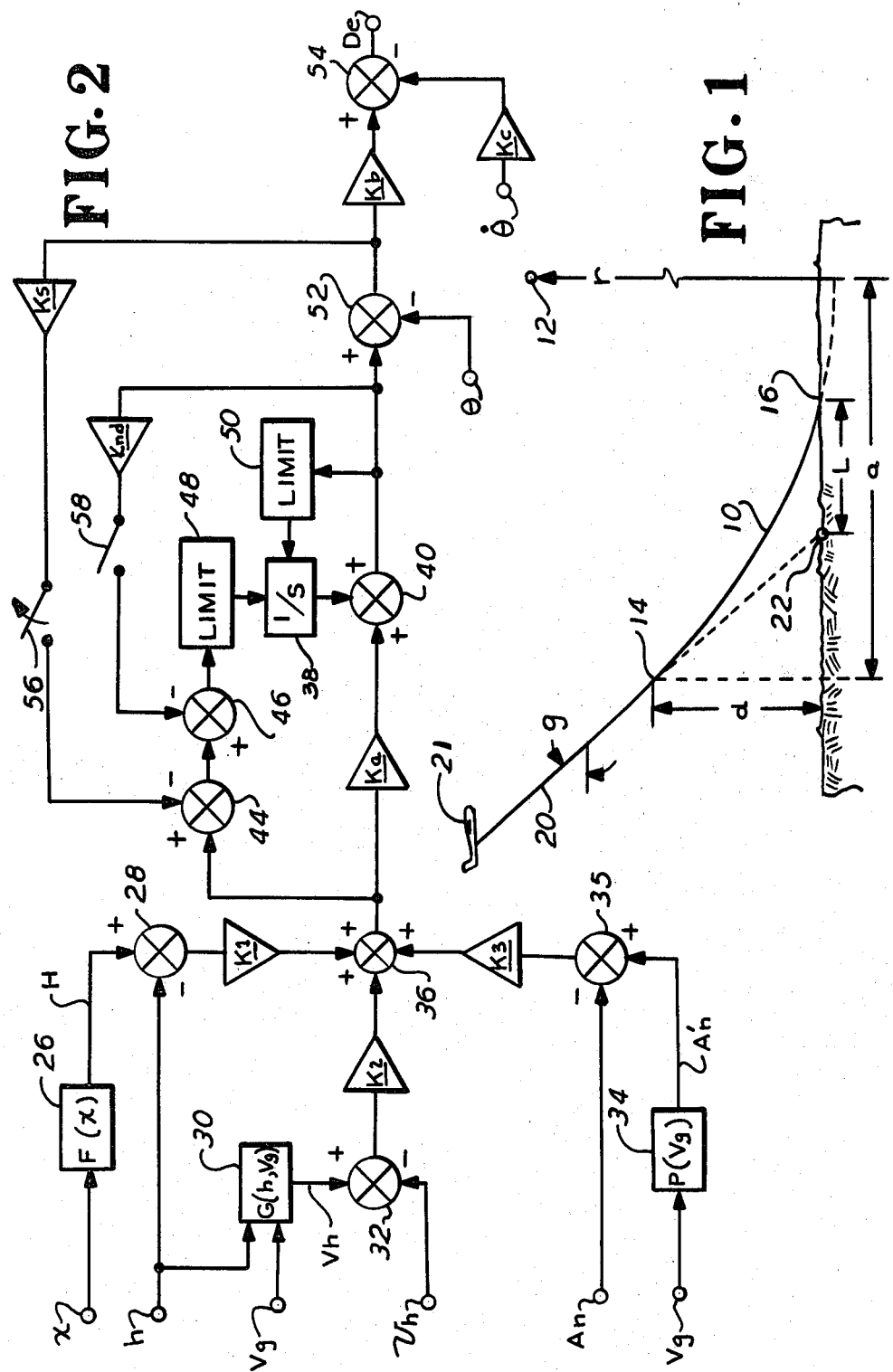

CONTROL SYSTEM

BACKGROUND OF THE INVENTION

The present invention relates to aircraft control systems and, in particular, to a flare control system which directs the aircraft onto a specific curvilinear path.

Known landing systems commonly employ a glide slope detector which carries the aircraft to within a certain distance of the landing strip after which a flare coupler is engaged. This flare coupler is commonly controlled by a radar altimeter, a normal accelerometer but no other aircraft sensors. Because of the relatively few controlling parameters, the dispersion of the touchdown point can be relatively large.

Conventional flare couplers attempt to direct an aircraft along an exponential path by keeping the descent rate proportional to altitude. However, these flare couplers do not measure and respond to the longitudinal displacement of the aircraft. As a result, wind gusts and other atmospheric disturbances can deflect the aircraft from the initial exponential path to another one of a family of exponential paths. Therefore, the final touchdown point is uncertain and its scattering will depend upon atmospheric conditions and disturbances.

An important consideration for flare control systems is the effect of noise produced by aircraft sensors controlling the flare maneuver. When only one aircraft sensor is employed to control the flare maneuver, its noise becomes an independent cause of scattering of the touchdown point.

An example of an integrated glide path/flare automatic flight control system is disclosed in U.S. Pat. No. 3,892,373.

SUMMARY OF THE INVENTION

In accordance with the illustrative embodiments demonstrating features and advantages of the present invention, there is provided a control system for directing an aircraft along a predetermined curvilinear descent path. The aircraft carries a plurality of sensors. The system includes a longitudinal means, a height means and a command means. The longitudnal means responds to at least one of the aircraft sensors for providing a longitudinal signal related to longitudinal displacement of the aircraft. The height means responds to the longitudinal signal for producing a height signal functionally related to the altitude required to follow the path. The command means responds to the height signal and a given one of the sensors for producing an error signal bearing a predetermined relation to the extent of deviation of the aircraft from the predetermined curvilinear descent path.

According to a related aspect of the present invention an aircrat motion monitoring system is provided which may cooperate with a control system such as the foregoing. This aircraft motion monitoring system has a velocity sensing means, a travel integrating means and a feedback means. The velocity sensing means can provide a velocity signal signifying ground speed of the aircraft. The travel integrating means can integrate the output of a longitudinal acceleration sensor carried on the aircraft. The feedback means is coupled around the travel integrating means. This feedback means includes a combinational means responsive to the longitudinal acceleration sensor and the velocity signal for driving the travel integrating means.

In another related aspect of the present invention, another aircraft motion monitoring system is provided that may advantageously cooperate with a control system such as the foregoing. This motion monitoring system has a descending means, an altitude differentiating means and a transfer means. The descending means responds to one of the aircraft sensors to produce a descent signal signifying aircraft descent rate. The altitude differentiating means operates to differentiate the output of the altitude sensor. The transfer means operates to produce a signal, the controlling influence in its production being transferred from the descending means to the altitude differentiating means in response to arrival of the aircraft at a predetermined position.

By employing the foregong equipment a flight control system is provided which can accurately control the flare maneuver of an aircraft on a definite curvilinear descent path. The system can respond to perturbations by continually converging the aircraft onto this path. Therefore the aircraft is not perturbed from the original descent path to another, but instead converges back to the original descent path.

In a preferred embodiment the flare descent path is a circular arc. This circular flare maneuver has the advantage of producing a small, constant normal acceleration and a regularly increasing pitch. The aircraft follows a circle having a radius of approximately 44,000 feet commencing at an altitude of 50 feet after leaving a glide slope of approximately 2.75°. The point of commencement of the circular flare maneuver is displaced 0.048 radians from vertical. Since the radius of this circle in this embodiment exceeds the elevation of the center by approximately 2.68 feet, the flare path definitely intersects the ground to avoid excessive "floating". It is to be appreciated that the above dimensions are merely exemplary.

The preferred control system responds to inertial sensors, radio sensors or other sensors typically carried on an aircraft. These sensors are employed by computing systems which derive the required positional data without incurring excessive noise or transients. Each positional datum may be developed by more than one aircraft sensor so that the noise inherent in each tends to cancel and produce a quieter signal. Also, aircraft sensors providing relevant data to the monitoring system to establish initial conditions but which are not considered sufficiently reliable to control the critical flare maneuver are subsequently decoupled when the flare maneuver is initiated. For example, a longitudinal accelerometer and a distance measuring radar can together initially establish the ground speed. However, during the subsequent flare maneuver the distance measuring radar is decoupled so that the typically more reliable accelerometer has the primary influence in developing a ground speed signal. For aircraft not carrying distance measuring radar an alternate technique employing a barometric altimeter is disclosed.

Also in a preferred embodiment, a glide slope system is used to determine the initial value of the descent rate. In this embodiment a signal from a normal accelerometer combines with those of a glide slope system and a distance measuring radar (or with that of a barometric altimeter) to provide a less noisy combined signal. Since the glide slope signals become unreliable during a flare maneuver, control is transferred to the radar altimeter and the normal accelerometer, equipment considered sufficiently reliable to control a flare maneuver.

The preferred embodiment also drives a control loop whose output error signal is clamped at zero prior to flare engagement thereby avoiding large transfer transients. This embodiment also employs a "nose down" circuit which responds to a command to pitch the aircraft downwardly by hastening the recovery time to such a command. This feature is significant since commanding a quick descent during a flare maneuver may lead to a dangerous condition and ought to be terminated as soon as possible.

BRIEF DESCRIPTION OF THE DRAWINGS

The above brief description, as well as other objects, features and advantages of the present invention will be more fully understood by reference to the following detailed description of presently preferred, but nonetheless illustrative embodiments, when taken in conjunction with the accompanying drawings wherein:

FIG. 1 is an illustration of a curvilinear descent path provided by the control system of the present invention;

FIG. 2 is a schematic illustration of a control system according to the present invention;

DETAILED DESCRIPTION OF THE PREFERRED EMBODIMENTS

Figure 3:
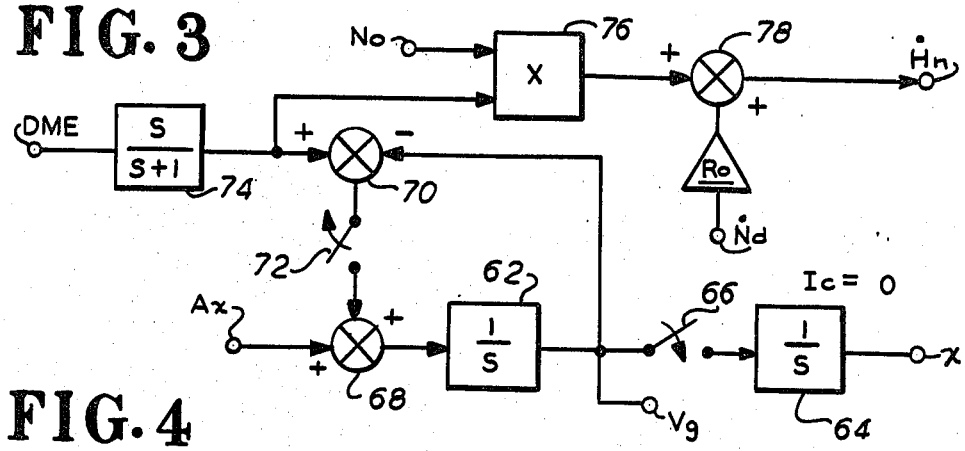
FIG. 3 is a schematic illustration of a longitudinal monitoring system which may cooperate with the control system of FIG. 1.

Referring to FIG. 1, an example of a predetermined curvilinear descent path 10 is given for an aircraft 21. Path 10 is essentially the arc of a circle having center 12 and a radius r of 44,000 feet. In this embodiment the elevation of center 12 is 2.68 feet less than radius 4. Arc 10 begins at point 14, a position 0.048 radians from vertical and continues to touchdown point 16. Arc 10 is tangent at beginning point 14 to glide slope path 20 which slopes 2.75° from horizontal. Glide slope path 20 extends as indicated by the dotted line to a glide slope transmitter 22 at ground level. Glide slope transmitter 22 is located a distance L from touchdown point 16, in this embodiment 500 feet. The horizontal distance between center 12 and beginning point 14 of arc 10 is marked as dimension a, in this embodiment 2,111.19 feet. Also the elevation of beginning point 14 of arc 10, marked as dimension d, is in this embodiment 50 feet.

Since the flare maneuver follows a circular arc, pitch regularly increases and normal acceleration is a small constant value. It is to be appreciated, however, that apparatus according to the principles of the present invention may cause an aircraft to follow another curvilinear descent path which is not circular.

Referring to FIG. 2, a control system is illustrated as a height means having function generator 26. The input of function generator 26 is connected to terminal x which receives from a longitudinal means (described hereinafter) a longitudinal signal signifying the horizontal displacement of aircraft 21 with respect to beginning point 14 (FIG. 1). The output H of function generator 26 is according to a function F(x). The transfer characteristics of this and other function generators will be described shortly, hereinafter. Line H of generator 26 is connected to the summing input of a command means shown comprising subtractive device 28, whose subtracting input is connected to a terminal h for receiving from a subsequently illustrated system a signal corresponding to the altitude of the aircraft.

Terminal h is also connected to one input of a speed means, shown herein as function generator 30, whose other input is connected to terminal Vg which receives from a subsequently illustrated device a signal corresponding to the ground speed of the aircraft. Generator 30 produces an output on line Vh that is a function G(h,Vg) of its input. Output line Vh is connected to the summing input of subtractive device 32 whose subtracting input is connected to terminal $v_h$. Terminal $v_h$ receives from the subsequently illustrated descent means a descent signal signifying the descent velocity of the aircraft. An acceleration means, shown herein as function generator 34, is connected to an input terminal Vg which is identical to that previously described. The output A′n of generator 34, a function P(vg) of its inputs, is connected to the summing input of subtractive device 35. Its subtractive input is connected to the terminal An which is referred to as a rate means and which receives a signal from a well known normal accelerometer mounted in the aircraft.

Summing device 36, also part of the above mentioned command means, has its three inputs separately connected to the outputs of scaling amplifiers K1, K2 and K3, whose inputs are connected to the outputs of subtractive devices 28, 32 and 35, respectively.

The functions F, G and P of function generators 26, 30 and 34 respectively, are preferably designed to constrain the aircraft to a circular flare path. To understand their operation first consider the general equation for a circular path of radius r:

$$(x-a)^2 + (h-b)^2 = r^2 \quad (1)$$

wherein the variables x and h are the horizontal and vertical displacement, respectively, of the aircraft with respect to a given origin. Quantities a and b are the horizontal and vertical displacement, respectively, of the center of the circle with respect to that origin. The above equation may be differentiated with respect to time and rearranged to arrive at the following relation:

$$V_h = \frac{(x-a)V_g}{b-h} \approx \frac{(x-a)V_g}{-r} \quad (2)$$

wherein $V_h$ is $\dot{h}$ and $V_g$ is $\dot{x}$. Substituting in the latter equation the value of (x-a) obtainable from equation 1, the following relation is obtained:

$$V_h = \frac{V_g \sqrt{r^2 - (b-h)^2}}{-r} \quad G(h, V_g) \quad (3)$$

As indicated by the functional notation G, this equation defines the response characteristics of function generator 30. By differentiating equation 1 with respect to time twice the following relationship is obtained:

$$V_g^2 + V_h^2 + (x-a)A_x + (h-b)A_h = 0 \quad (4)$$

wherein $A_h$ is $\ddot{h}$ and $A_x$ is $\ddot{x}$. Assuming in the latter equation that $V_g \gg V_h$, its second additive term containing $V_h$ may be dropped. Also assuming that $b \gg h$, the term h may be eliminated from the latter equation.

Finally, if the term $A_x$ is considered sufficiently negligible as to be set approximately equal to zero then the third additive term containing it may be deleted. Consequently, the latter equation may be rearranged as follows:

$$A_h = V_g^2/b \tag{5}$$

However, since An is approximately equal to $A_h$ and b is approximately equal to r then the latter equation may be expressed as follows (An is normal acceleration):

$$An = V_g^2/r = P(V_g) \tag{6}$$

wherein the functional notation P is also used to identify the response characteristics of function generator 34. Finally, equation 1 may be rearranged so that the term h appears as a function F of the term x as follows:

$$h = b - \sqrt{r^2 - (a - x)^2} = F(x) \tag{7}$$

Summarizng the foregoing, the three functional expressions F, G and P (equations 7, 3 and 6, respectively) define the set of functions which the present system employs to determine deviation of an aircraft from a predetermined curvilinear descent path, an arc of a circle in this embodiment.

The individual error signals are summed at summing device 36 to produce a combined error signal which is applied to an activating means shown herein as control integrator 38 and its associated circuitry. The output of control integrator 38 is applied to one input of summing device 40 whose other input is connected to the output of scaling amplifier Ka. The input of amplifier Ka is connected to the junction of the output of summing device 36 and the summing input of subtractive device 44. The output of subtractive device 44 is applied to the summing input of subtracting device 46 whose output is coupled to the input of limiting device 48, a device whose transfer characteristic is linear until it saturates when its input exceeds a predetermined magnitude. The output of limiting device 48 drives the input of control integrator 38. The output of summing device 40 is applied to an input of another limiting device 50 which is constructed similarly to limiting device 48. The output of limiting device 50 is applied to a control input of integrator 38 to freeze its output value when the input of limiting device 50 exceeds a predetermined magnitude.

The output of summing device 40 is applied to the summing input of subtractive device 52 whose subtracting input is connected terminal $\theta$. The latter terminal receives a signal proportional to the pitch angle of the aircraft. The output of subtractive device 52 is applied to input of scaling amplifier Kb whose output drives the summing input of subtractive device 54. Its subtracting input is coupled to the output of scaling amplifier Kc whose input is connected to terminal $\dot{\theta}$ which terminal receives a signal that is the time rate of change of the signal on terminal $\theta$. The output of subtractive device 54, terminal De, is the overall error signal used to control the pitch of the controlled aircraft.

A clamping signal is fed back around the activating means by a clamping means, shown herein as the serial combination of scaling amplifier Ks and flare switch 56. As described hereinafter the clamping means keeps integrator 38 and the output of subtractive device 52 in a state corresponding to zero error. Flare switch 56 is connected between the subtracting input of subtractive device 44 and the output of scaling amplifier Ks whose input is connected to the output of subtractive device 52. Flare switch 56 opens as shown by its directional arrow when the aircraft commences a flare maneuver as further described hereinafter. Such actuation may be initiated manually or automatically when the aircraft reaches a preset altitude.

An overcorrection limiting means is shown herein as scaling amplifier Knd and automatic switch 58. Switch 58 is connected between the subtracting input of subtractive device 46 and the output of scaling amplifier Knd whose input is connected to the output of subtractive device 40. Automatic switch 58 closes and limits the rate of change of integrator 38 whenever the current command signals might require the aircraft to fly downwardly (nose down condition). The latter situation must not be prolonged during a flare maneuver since a significant and dangerous loss in altitude may ensue. Accordingly, in this embodiment scaling amplifier Knd and switch 58 operate to moderate the changes in integrator 38 whenever the polarity of the output of device 40 requires the aircraft to pitch toward a nose down condition.

Referring to FIG. 3, a portion of an aircraft motion monitoring system employing a longitudinal means is shown herein as a pair of travel integrating means comprising precedent integrator 62 and subsequent integrator 64. A switching device 66 is connected between the output of integrator 62 (terminal Vg) and the input of integrator 64. Prior to closure of switch device 66 integrator 64 produces an output of zero. Precedent integrator 62 has a combinational feedback means coupled around it which includes a travel summing means comprising summing device 68 and subtractive device 70 whose subtracting terminal is connected to the output of integrator 62. A switching means 72 is connected between the output of subtractive device 70 and an input of summing device 68 whose other input is connected to terminal Ax which receives a signal from a longitudinal acceleration sensor. This sensor is an accelerometer typically found on an aircraft for measuring acceleration forces along the length of an aircraft.

The input and output of integrator 62 are separately connected to the output of summing device 68 and the subtracting input of subtractive device 70, respectively. It is to be noted that switches 72 and 66 transfer in the direction indicated by their respective arrows when the aircraft commences a flare maneuver in a manner similar to switch 56 of FIG. 2.

Coupled to the summing input of subractive device 70 is the output of a velocity sensing means shown herein as a travel differentiating means 74. Device 74 in this embodiment not only differentiates but also provides some low pass filtering which may be expressed by a Laplace transform of the form: s/(s+1). An example of such a device would be a resistive-capacitive divider, the output across the resistor, scaled for a time constant of one second. Alternatively, a digital filter or a computer processing technique can be implemented to provide such a transfer characteristic. The input to differentiating means 74 is derived from a longitudinal displacement sensor identified as input terminal DME. In this embodiment terminal DME connects to the distance measuring radar equipment frequently carried by an aircraft.

The output of differentiating means 74 is also coupled to a glide means (sometimes referred to herein as a fall means) comprising multiplier 76. Multiplier 76 has one input connected to the output of differentiating means 74 and its other output connected to terminal No. The signal applied to terminal No is proportional to the nominal glide slope angle (identified as angle g in FIG. 1). The output of multiplier 76 is connected to one of the inputs of summing device 78 whose other input is driven by the output of scaling amplifier Ro. Scaling amplifier Ro provides an output signal proportional to its input on terminal $\dot{N}d$ by a factor Ro. The signal on terminal $\dot{N}d$ is the time rate of change of the well known desensitized beam output of a glide slope instrument. A desensitized signal is derived by multiplying the angular beam error by the altitude to provide a signal approximately proportional to the altitude error with respect to the glide slope beam. Thereafter amplifier Ro multiplies the desensitized beam signal by a scale factor (referred to herein as Ro) to provide a signal directly related to altitude error.

The output $\dot{H}n$ of summing device 78 may be expressed as follows:

$$\dot{H}n = V_x (No) + (\dot{N}d) Ro \qquad (8)$$

wherein the term $v_x$, the output of differentiator 74, is a measure of ground speed. Accordingly, since the term No is approximately equal to its tangent, the first additive term after the equal sign is approximately the vertical velocity an aircraft would achieve for a given ground speed if it followed the nominal glide slope without error. The second additive term, the rescaled rate of change of the desensitized beam error signal, is a measure of the vertical velocity of the aircraft with respect to the nominal glide slope. Therefore, the two additive terms on the right hand side of the above equation, constituting all of the vertical velocity components, together equal the total vertical velocity, term $\dot{H}n$.

As previously mentioned, the signal on terminal Ax signifies the output of an accelerometer sensing acceleration along with the longitudinal axis of the aircraft. Accordingly, when switch 72 is open, as it is during a flare maneuver, integrator 62 produces in a well understood manner an output on terminal Vg signifying the velocity of the aircraft along its longitudinal axis. Since the pitch of the aircraft is relatively small, the signal on terminal Vg approximates the ground speed of the aircraft. Prior to the opening of switch 72 the signals on terminals Ax and DME are related as follows to the output of integrator 62 on terminal Vg:

$$Vg = \frac{Ax + sD}{s + 1} \qquad (9)$$

wherein the term D is equal to DME/(s+1), DME being the distance signal present on terminal DME. From the foregoing equation it is apparent that the output signal on terminal Vg is a combination derived from the signals on terminals Ax and DME and in the same proportion. Since two independent sensors are cooperating their respective noise components do not correlate so that the combined system is less noisy than a system employing only one sensor. The foregoing equation can be simplified by assuming that D=x and that Ax=$s^2$x (x being actual horizontal displacement). With the foregoing assumptions the equation 9 reduces to Vg=sx.

It will be appreciated that the foregong equipment, supplying signals to the apparatus of FIG. 2, has alternate forms. While signals may be obtained from a pair of sensors such as a distance measuring radar and a longitudinal accelerometer, other sensors can be used. Also the type of filtering can be altered depending upon system requirements and the expected noise spectrum. Furthermore, while the system has been illustrated in terms of discrete circuit blocks, much of the foregoing can be implemented by digital filters, by a microcomputer or similar equipment.

Figure 4:
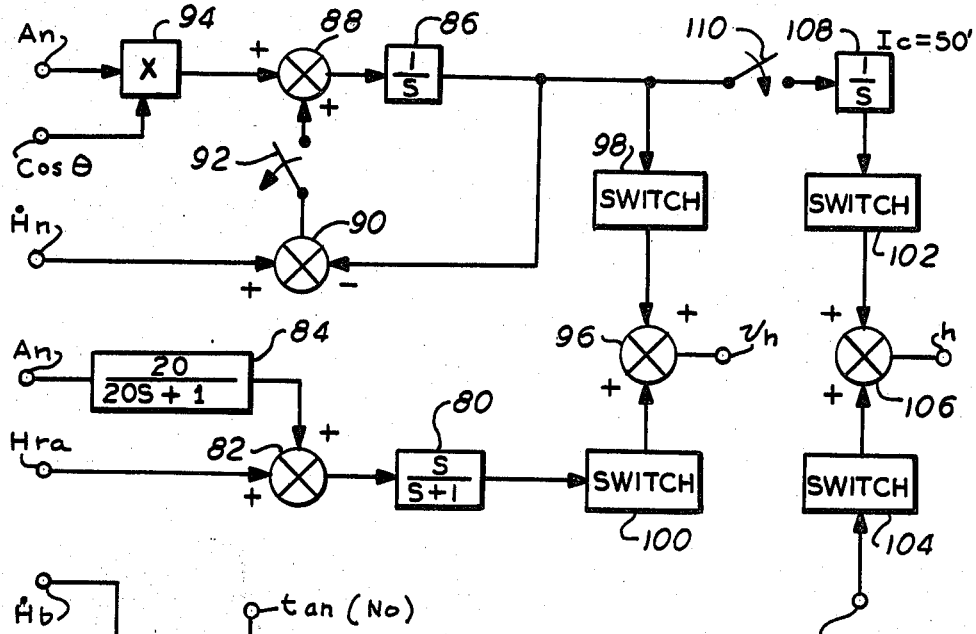
FIG. 4 is a schematic illustration of a descent monitoring system which may cooperate with the control system of FIG. 1.

Referring to FIG. 4, another portion of an aircraft motion monitoring system is illustrated which employs a descent means having an altitude differentiating means shown herein as block 80. In this embodiment block 80 is a device having a transfer characteristic which may be expressed in terms of the following Lapace transform: s/(s+1). This device may be characterized as a differentiating circuit having an output filtered by a single pole low pass filter such as a resistive-capacitive divider. The input to the altitude differentiating means 80 is coupled to the output of the additive means shown herein as summing device 82 whose two inputs are separately connected to terminal Hra and the output of a signal conditioning means, shown herein as block 84 having the following transfer characteristic expressed as a Laplace transform: 20/20(20s+1). Block 84 is a filtering device which may be characterized as a single pole low pass filter such as a resistive-capacitive divider having a time constant of 1/20 of a second. The input of device 84, terminal An, is the output of a normal acceleration sensor which is in this embodiment a normal accelerometer carried on the aircraft. Terminal Hra is the output terminal of an altitude sensor such as a radar altimeter.

A descending means operating as a descent integrating means employs an integrator 86 whose input and output are connected to the output of summing device 88 and the subtracting input of subtractive device 90, respectively. A controlled flare switch 92 is connected between the output of subtracting device 90 and one of the inputs of device 88, its other input being connected to the output of multiplier 94. Switch 92 opens in the direction indicated by its directional arrow when the aircraft commences a flare maneuver. Multiplier 94 has input terminals cos $\theta$ and An, the latter being the same as the terminal above bearing the identical reference character. Terminal cos $\theta$ receives a signal corresponding to the cosine of the pitch angle of the aircraft. The summing input of subtractive device 90, terminal Hn, is connected to the terminal of FIG. 3 bearing the identical reference character. As explained in connection with an alternate embodiment terminal Hn may be connected instead to a sensor producing a signal signifying the time rate of change of a barometric altimeter.

A transfer means is shown herein as summing device 96 having an output terminal $v_h$ and two summing input terminals separately connected to the outputs of gradual switching devices 98 and 100. Switching devices 98 and 100 work in unison to gradually reduce the influence on device 96 of switch 98 while grandually increasing the influence on device 96 of switch 100. Switches 98 and 100 each have a transfer characteristic that varies between zero and unity, their sum equalling unity. The inputs of switching devices 98 and 100 are connected to the outputs of devices 86 and 80, respectively.

A transistion means of a height means is shown herein as a pair of switching devices 102 and 104 which operate identically as previously described switches 98 and 100, respectively. The input of switching device 104, terminal Hra, receives the same signal, the identically labelled input of device 82. The outputs of switches 102 and 104 are separately connected to different inputs of summing device 106 whose output is identified as terminal h. The input of switching device 102 is connected to the output of a height integrating means, shown herein as integrator 108. Connected between the output of integrator 86 and the input of integrator 108 is a switching device 110 which transfers to a closed position as shown by its directional arrow when the aircraft commences a flare maneuver.

The equipment surrounding integrator 86 is similar to that previously described in connection with integrator 62 of FIG. 3. Accordingly, the output of integrator 86 may be characterized as follows:

$$\frac{a + \dot{H}n}{s + 1} \quad (10)$$

wherein a is the output of multiplier 94. Since the output of multiplier 94 is approximately $s^2h$ and since the signal on terminal $\dot{H}n$ may be approximated as $sh$ (wherein h is the actual altitude of the aircraft) then the above expression reduces to $sh$, the actual descent rate of the aircraft. It is apparent that when switch 92 opens during a flare maneuver that the output of integrator 86 will correspond to $(An \cos \theta)/s$. Referring to the above assumptions, this latter expression is approximately $sh$, that is, the vertical descent rate.

Referring to integrator 80 it is apparent that its output may be expressed as follows:

$$\frac{20An + 20sHra + Hra}{20s^2 + 21s + 1} s \quad (11)$$

If it is assumed that the terms An and Hra are approximately equal to $s^2h$ and h, respectively, wherein h is the actual aircraft altitude, then the foregoing expression may be simplified as follows:

$$\frac{20s^2 + 20s + 1}{20^2 + 21s + 1} h \quad (12)$$

Since the fractional Laplace operator in the above expression is approximately equal to unity, the output of differentiator 80 is approximately equal to h, the actual altitude of the aircraft. Again, the combining of sensors produces a less noisy, complimented signal since the noise does not correlate.

Alternate configurations are contemplated for the apparatus of FIG. 4. For example, alternate aircraft sensors may be substituted to obtain the signal outputs of terminals $v_h$ and h. It is also anticipated that the filtering can be altered depending on the desired response time. Furthermore, it is expected that signal transformations described herein may be implemented in some embodiments by a microcomputer or other digital device.

Figure 5:
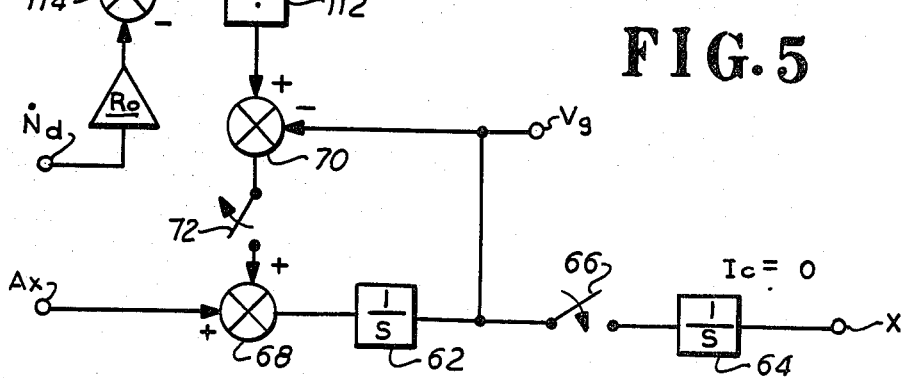
FIG. 5 is a schematic illustration of an alternate longitudinal monitoring system which may cooperate with the control system of FIG. 1.

Referring to FIG. 5, an aircraft motion monitoring system is shown which is an alternate to that illustrated in FIG. 3. This embodiment is useful where a distance measuring radar is unavailable or where it is preferable to use a barometric altimeter. In this embodiment elements 62, 64, 66, 68, 70 and 72 together with their terminals Ax, Vg, and x are identical to similarly labelled elements of FIG. 3, except that the summing terminal of subtractive device 70 is connected to the output of divider 112. Divider 112 has an input connected to the output of subtractive device 114 to divide that output by the magnitude of the signal appearing on terminal tan (No). The signal applied to the latter terminal is the tangent of the nominal glide slope angle (identified as angle g of FIG. 1). Subtractive device 114 has its summing input connected to terminal $\dot{H}b$ and its subtracting input connected to the output of scaling amplifier Ro whose input is connected to terminal $\dot{N}d$. Scaling amplifier Ro and terminal $\dot{N}d$ are identical to similarly identified components of FIG. 3. Applied to terminal $\dot{H}b$ is a signal signifying the time rate of change of the barometric altimeter. It is clear that the output of divider 112 may be expressed as follows:

$$\frac{\dot{H}b - Ro(\dot{N}d)}{\tan(No)} = Vx \quad (13)$$

This output Vx may be shown to be the ground speed of the aircraft by rearranging equation 13 as follows:

$$\dot{H}b = Vx \tan (No) + Ro(\dot{N}d) \quad (14)$$

The first term after the equal sign is the altitude rate which the aircraft would maintain if it followed the nominal glide slope without error. The second additive term is the altitude rate of the aircraft with respect to the nominal glide slope as measured by the desensitized beam output $\dot{N}d$. As before the desensitized beam is corrected by the factor Ro to achieve the proper scaling of altitude. Since the two foregoing additive terms comprise all of the altitude rate components, they equal the total altitude rate $\dot{H}b$. Therefore, the output Vx of divider 112 is a measure of ground speed.

Since this ground speed signal applied to the summing input of subtractive device 70 is an analog of the output of the differentiator 74 of FIG. 3, the balance of the equipment of FIG. 5 operates similarly as that of FIG. 3.

To facilitate an understanding of the principles associated with the apparatus of FIGS. 2, 3 and 4, its operation will be briefly described. It is appreciated, however, that the equipment of FIG. 5 may be substitued for that of FIG. 4 and that the operation after such substitution will be similar.

Initially, aircraft 21 (FIG. 1) follows glide slope 20 defined by glide slope transmitter 22 in a conventional manner. The glide slope detector on board the aircraft 21 develops a desensitized beam error signal which is proportional to the altitude error of aircraft 21 with respect to glide slope 20.

During this interval switch 56 (FIG. 2) is closed causing large negative feedback from the output of subtractive device 52 to integrating circuit 38. Consequently, integrator 38 is driven in a direction to cause the output from subtractive device 52 to be zero. Therefore, integrator 38 produces an offset signal which initially counterbalances any error signals which may be produced from the calculations performed by function generators 26, 30, and 34. As will be clear from subsequent description, establishing this initial condition is important since it tends to avoid transient disturbances that might otherwise occur when flight control is transferred to devices 26, 30 and 34. Also at this time, switch 72 (FIG. 3) is closed so that the accelerometer signal on terminal Ax and the distance measuring radar signal on terminal DME produce a combined output Vg from integrator 62 signifying the ground speed of the aircraft, in a manner already described.

It should be noted that the distance measuring radar (output terminal DME) in the present invention does not have redundancy or other features which would render it sufficiently reliable to justify having it control an aircraft during the very critical flare maneuver. However, the distance measuring radar in this embodiment is required to establish definite initial conditions for ground speed. In contrast, the accelerometer signal of terminal Ax since it must be integrated to provide velocity information, is by itself ambiguous to the extent the constant of integration is unknown.

Also at this time, the velocity signal obtained from differentiator 74 together with the rate of change of the desensitized beam error signal (terminal $\dot{N}d$) are combined in summing device 78 to produce a signal at terminal $\dot{H}n$ which signifies the vertical descent rate of the aircraft, in a manner previously described. During the glide slope maneuver, switch 92 (FIG. 4) is closed so that the vertical descent rate signal on terminal $\dot{H}n$ (this Figure and FIG. 3) combines with the normal accelerometer signal of terminal An to produce on the output of integrator 86 a combined signal signifying the descent rate of the aircraft in a manner previously described. It should be noted that the signal on terminal $\dot{H}n$ being partly derived from the distance measuring radar, is not deemed sufficiently reliable in this embodiment to control aircraft flight during the critical flare maneuver. However, since this radar output is a direct measure of the vertical descent rate it can resolve ambiguities regarding initial conditions or constants of integration. Such ambiguities could arse from relying only upon the accelerometer signal on terminal An which must be integrated to determine the descent rate.

During this interval, switch 98 connects the output of integrator 86 directly to one input of summing device 96 while switch 100 is effectively open. Consequently, the descent rate signal on terminal $v_h$ is directly derived from integrator 86.

Integrators 108 and 64 have open inputs since their associated switches 110 (FIG. 4) and 66 (FIG. 3), respectively, are open. Consequently, integrators 64 and 108 produce preset constant signals corresponding to 0 feet and 50 feet, respectively. The latter quantity corresponds to the altitude of the flare engage point 14 (FIG. 1).

As the aircraft arrives at a predetermined position, flare engage point 14 (FIG. 1), switches 66 (FIG. 3) and 110 (FIG. 4) both close so that their respective integrators 64 and 108 can now change value. Since integrator 64 integrates the ground speed signal Vg, its output on terminal x signifies the longitudinal position of the aircraft with respect to point 14 (FIG. 1). Correspondingly, integrator 108 (FIG. 4) integrates the descent rate signal from integrator 86 to provide on terminal h a signal signifying the altitude of the aircraft.

Also at this time switch 72 (FIG. 3) opens thereby removing the influence of the output of the distance measuring radar (terminal DME). Consequently, integrator 62, whose initial conditions were correctly established by the distance measuring radar, now responds only to the signal applied to terminal Ax by the longitudinal accelerometer, a device sufficiently reliable to control the flare maneuver.

Also at this time, switch 92 opens thereby eliminating the influence of the signal on terminal $\dot{H}n$ derived from the desensitized beam error signal. Instead, integrator 86, whose initial conditions were correctly established by the desensitized beam error signal, integrates on the signal on terminal An from the normal accelerometer, a device sufficiently reliable to control aircraft flight during the critical flare maneuver.

As a result, the measured and processed positional data are applied to inputs terminals x, h, Vg, $v_h$, An and Vg of FIG. 2. At this time also, clamping switch 56 (FIG. 2) opens so that integrator 38 is free to produce from subtractive device 52 a non-zero error signal. Instead integrator 38 is now influenced by the error signals produced by function generators 26, 30 and 34. However, since integrator 38 was initially clamped, its error signal from subtractive device 52 does not instantaneously change but, instead, changes gradually to avoid violent aircraft maneuvers. Eventually, however, function generators 26, 30 and 34 produce error signals to command the aircraft to flare from its linear glide slope and pitch upwardly. Accordingly, the aircraft follows circular arc 10 (FIG. 1). Since the error signal from device 36 responds to more than one positional datum it is able to cause definite convergence of the aircraft onto path 10 even after perturbations from wind gusts or other atmospheric disturbances.

These error signals are scaled by amplifiers K1, K2 and K3, combined by summing device 36 and fed forward through integrator 38 and parallel scaling amplifier Ka. With this arrangement integrator 38 may change to a value approximating the required nominal pitch, scaling amplifier Ka transmitting high speed corrections in response to various disturbances. Since integrator 38 produces most of the correction signal, the dynamic range required of scaling amplifier Ka is reduced. Limiting devices 48 and 50 in the input and output, respectively, of integrator 38 prevent it from changing its value too quickly or too much. This feature is important since an unusual disturbance might draw integrator 38 so far from its ordinary nominal value that it may take an unacceptably long time to resettle. The outputs from integrator 38 and scaling amplifier Ka are combined in summing device 40 to produce a pitch command signal which is compared by subtractive device 52 to the actual pitch measurement applied to transducer terminal θ. Subtractive device 52 transmits its pitch error signal through scaling amplifier Kb to a subtractive device 54 which incorporates rate feedback through scaling amplifier Kc whose input (terminal $\dot{\theta}$) signifies the time rate of change of aircraft pitch. The final error signal of terminal De is coupled to a conventional servo loop (not shown) to operate the aircraft control surfaces such as the elevator.

Since commanding a downward pitch during a flare maneuver is dangerous, switch 58 responds to such a command from summing device 40 by closing and thereby providing negative feedback around integrator 38. This feedback effectively limits changes in integrator 38 so it is not drawn to an enduring value which may continue to direct the aircraft into a nose down condition.

As aircraft 21 continues along flare path 10 (FIG. 1) switches 98, 100, 102 and 104 (FIG. 4) gradually alter their transfer characteristics. Switches 98 and 102, initially having a unity transfer characteristic and switches 100 and 104 initially having a zero transfer characteristic, commence after aircraft 21 arrives at transfer point 14 (FIG. 1) to reverse their roles. Switches 98 and 100, as well as switches 102 and 104, gradually change but keep the sum of their transfer characteristics equal to unity. This transfer, occuring within several seconds, avoids transients which might otherwise occur were control abruptly shifted to different aircraft sensors. The net effect of the foregoing transfer is to substitute the radar altimeter (terminal Hra) for the glide slope detector (terminal Hn). This feature is significant since the glide slope detector becomes unreliable during flare as the radar altimeter, now operating over flat terrain, becomes accurate.

In this manner the aircraft sensors cooperating with the foregoing equipment keep aircraft 21 on path 10 unitl it touches down at touchdown point 16.

It is to be appreciated that modifications and alterations may be implemented with respect to the apparatus just described. For example, the functions of various devices described, including the function generators 26, 30 and 34 may be implemented by analog circuitry or digital computing equipment. In addition, filters having different bandpass characteristics may be substituted for those previously described depending upon the expected noise spectrum. Moreover, the scaling factors used in various scaling amplifiers may be modified depending upon the physical requirements of a specific aircraft. Also, various aircraft sensors may be substituted for those previously described as a matter of convenience. It is also to be understood that while a circular flare path was shown, other paths may be chosen depending upon the aircraft geometry, the runway length, expected wind conditions, the tolerable complexity of the control system, etc.

Obviously many other modifications and variations of the present invention are possible in light of the above teachings. It is therefore to be understood that within the scope of the appended claims, the invention may be practiced otherwise than as specifically described.

What is claimed is:

1. A control system for controlling an aircraft along a predetermined curvilinear descent path, said aircraft carrying a first and second sensor means for providing signals corresponding to sensed conditions, said system comprising:
   longitudinal means connected to said first sensor means and responsive to the signal therefrom for providing a longitudinal signal related to the longitudinal displacement of said aircraft;
   height means connected to said longitudinal means and responsive to the longitudinal signal therefrom for providing a height signal functionally related to an altitude of the aircraft required to follow said path;
   command means connected to said height means and responsive to said height signal and a signal from said second sensor means for providing an error signal bearing a predetermined relation to the extent of deviation of said aircraft from said predetermined curvilinear descent path; and
   means connected to said command means and responsive to said error signal for controlling said aircraft along said predetermined curvilinear descent path.

2. A control system according to claim 1 wherein said second sensor means comprises an altitude responsive sensor, and wherein said first sensor means comprises a ground speed responsive sensor, said system comprising:
   descent means connected to said altitude responsive sensor and responsive to the signal therefrom for providing a descent signal signifying aircraft descent rate, said command means including:
   speed means connected to said ground speed responsive sensor and responsive to the signals therefrom for providing a speed signal corresponding to the aircraft descent rate required to follow said path, said command means and its error signal being responsive to a signal corresponding to the deviation between said descent and speed signals.

3. A control system according to claim 2 further comprising:
   rate means connected to said second sensor means and responsive to the signal therefrom for providing a rate signal signifying aircraft acceleration; and
   acceleration means connected to said first sensor means and responsive to the signal therefrom for providing an acceleration signal corresponding to the aircraft acceleration required to follow said path, said command means being connected to said rate and acceleration means, the error signal of said command means being responsive to the deviation between said acceleration and rate signals.

4. A control system according to claim 3 wherein said predetermined curvilinear path includes an arc of a circle and wherein said acceleration means provides said acceleration signal as a function of:

$$(V_g)^2/b$$

wherein $V_g$ is the horizontal velocity of said aircraft and b is a constant.

5. A control system according to claim 4 wherein b is the elevation of the center of said arc.

6. A control system according to claim 2 wherein said descent means comprises:
   altitude differentiating means for differentiating the signal from said altitude responsive sensor.

7. A control system according to claim 6 wherein said second sensor means includes a normal acceleration sensor and wherein said descent means further comprises:
   signal conditioning means connected to and driven by the signal from said normal acceleration sensor to provide a conditioned signal, said conditioning means having a predetermined transfer characteristic; and
   additive means connected to said altitude responsive sensor and said conditioning means and responsive to the additive combination of the signals therefrom for driving said altitude differentiating means, said predetermined characteristics being dimensioned to produce from said altitude differentiating means a signal signifying the descent rate of said aircraft.

8. A control system according to claim 2 wherein said altitude responsive sensor includes a pair of transducers, said descent means comprises:
   transfer means connected to said pair of transducers and responsive to the signals therefrom for transferring controlling influence over the production of said descent signal from one of said transducers to another, said transfer means being operable after arrival of said aircraft at a predetermined position.

9. A control system according to claim 8 wherein said second sensor means includes a normal acceleration sensor and a glide slope sensor and said first sensor means includes a longitudinal displacement sensor and wherein said descent means comprises:

glide means connected to said longitudinal displacement sensor and said glide slope sensor and responsive to signals therefrom for providing a fall signal signifying the descent rate of said aircraft; and descent integrating means connected to said glide means and said normal acceleration sensor for combining and integrating said fall signal and the signal from said normal acceleration sensor, said descent integrating means being operable to decouple from itself said fall signal after arrival of said aircraft at said predetermined position, said transfer means being operable to transfer said controlling influence from said descent integrating means after arrival of said aircraft at said predetermined position.

10. A control system according to claim 9 wherein said descent means comprises:

altitude differentiating means for differentiating the signal from said altitude responsive sensor;

signal conditioning means driven by the signal from said normal acceleration sensor to provide a conditioned signal, said conditioning means having a predetermined transfer characteristic; and additive means connected to said altitude sensor and said signal conditioning means and responsive to the additive combination of the signals therefrom for driving said altitude differentiating means, said predetermined characteristic being dimensioned to produce from said altitude differentiating means a signal signifying the descent rate of said aircraft, said transfer means being operable to transfer said controlling influence to said altitude differentiating means after arrival of said aircraft at said predetermined position.

11. A control system according to claim 10 wherein said height means further comprises:

height integrating means connected to said descent integrating means for integrating its output after arrival of said aircraft at said predetermined position; and transition means for gradually transferring influence in the production of said height signal from said height integrating means to said altitude responsive sensor.

12. A control system according to claim 2 wherein said predetermined curvilinear path includes an arc of a circle and wherein said speed means provides said speed signal as a function of:

$$(V_g/r) \sqrt{r^2 - (b - h)^2}$$

wherein $V_g$ is the horizontal velocity of said aircraft, h is the output of said altitude responsive sensor and r and b are constants.

13. A control system according to claim 12 wherein r and b are the radius of and the elevation of the center of said arc, respectively.

14. A control system according to claim 1 wherein said first sensor means includes a longitudinal acceleration sensor, said longitudinal means comprising:

a pair of travel integrating means connected in series for doubly integrating the signal from said longitudinal acceleration sensor.

15. A control system according to claim 14 wherein said first sensor means includes a longitudinal displacement sensor, said longitudinal means further comprising:

a feedback means connected around the precedent one of said pair of travel integrating means, said feedback means including combinational means connected to and responsive to the signals from said longitudinal acceleration sensor and said displacement sensor for driving said precedent one of said pair of travel integrating means.

16. A control system according to claim 15 wherein said feedback means comprises:

travel differentiating means for differentiating the signal from said longitudinal displacement sensor; and travel summing means for driving the precedent one of said travel integrating means with a travel summing signal, said travel summing signal signifying the sum of the signals from the longitudinal acceleration sensor and said travel differentiating means, said travel differentiating means having a response characteristic dimensioned to produce a signal from said pair of travel integrating means signifying longitudinal displacement of said aircraft.

17. A control system according to claim 15 wherein said feedback means includes:

a switching means connected to said longitudinal displacement sensor for eliminating its influence and for eliminating feedback provided by said feedback means, said switching means being operable after arrival of said aircraft at a predetermined position.

18. A control system according to claim 17 further comprising:

a switching device for connecting together said pair of integrating means, said switching device being operable after arrival of said aircraft at a predetermined position.

19. A control system according to claim 14 wherein said first sensor means includes a glide slope sensor, said longitudinal means further comprising:

a feedback means connected around the precedent one of said pair of travel integrating means, said feedback means including combinational means connected to said longitudinal acceleration sensor and said glide slope sensor and responsive to signals therefrom for driving said precedent one of said pair of travel integrating means.

20. A control system according to claim 19 wherein said feedback means includes:

glide means for providing at least to said precedent one of said travel integrating means a signal component which is a function of the linear combination of the rates of change of the outputs of said altitude responsive sensor and said glide slope sensor.

21. A control system according to claim 1 wherein said predetermined curvilinear path includes an arc of a circle.

22. A control system according to claim 21 wherein said height means provides its height signal as a function of:

$$-b + \sqrt{r^2 - (a - x)^2}$$

wherein x is said longitudinal signal and r, b and a are constants.

23. A control system according to claim 22 wherein r, b and a are the radius of said arc, the elevation of the center of said rc, and the horizontal distance from the beginning to the center of said arc, respectively.

24. A control system according to claim 1 wherein said command means comprises:
   activating means connected to said command means and responsive to its error signal to provide a surface correction signal; and
   clamping means connected around said activating means for clamping said surface correction signal prior to arrival of said aircraft at a predetermined position.

25. A control system according to claim 24 wherein said command means includes:
   overcorrection limiting means connected to said activating means for compensating against said surface correction signal commanding an aircraft descent rate in excess of a predetermined magnitude.

26. A control system according to claim 25 wherein said activating means includes:
   a control integrator connected to said clamping means, said clamping means being operable to clamp said control integrator, said overcorrection means being connected around said control integrator to provide negative feedback.

27. In a control system for controlling an aircraft along a predetermined curvilinear descent path, said aircraft carrying a longitudinal acceleration sensor for providing a signal corresponding to a sensed condition, an aircraft motion monitoring system comprising:
   velocity sensing means for providing a velocity signal signifying the ground speed of said aircraft;
   travel integrating means for integrating the signal from said longitudinal acceleration sensor;
   a feedback means connected around said travel integrating means, said feedback means including combinational means connected to said velocity sensing means and said longitudinal acceleration sensor and responsive to the signals therefrom for driving said travel integrating means; and
   means connected to said travel integrating means and responsive to signals therefrom for controlling said aircraft along said predetermined curvilinear descent path.

28. In a control system according to claim 27 wherein said feedback means includes:
   switching means connected to said velocity sensing means for eliminating its influence and for eliminating feedback provided by said feedback means after arrival of said aircraft at a predetermined position.

29. In a control system for controlling an aircraft along a predetermined curvilinear descent path, said aircraft carrying a sensor means including an altitude responsive sensor for providing signals corresponding to sensed conditions, an aircraft motion monitoring system comprising:
   descending means connected to said sensor means and responsive to the signal therefrom for providing a descent signal signifying aircraft descent rate;
   altitude differentiating means for differentiating the signal from said altitude responsive sensor;
   transfer means for providing a signal, the controlling influence in its production being transferred from said descending means to said altitude differentiating means after arrival of said aircraft at a predetermined position; and
   means connected to said transfer means and responsive to its signal for controlling said aircraft.

30. In a control system according to claim 29 wherein said sensor means includes a normal acceleration sensor, and wherein said descending means comprises:
   fall means connected to said sensor means and responsive to the signal therefrom for providing a fall signal signifying the descent rate of said aircraft; and
   descent integrating means connected to said fall means and said normal acceleration sensor for combining and integrating said fall signal and signal from said normal acceleration sensor, said descent integrating means being operable to decouple from itself said fall signal after arrival of said aircraft at said predetermined position.

31. In a control system according to claims 29 or 30 wherein said sensor means includes a normal acceleration sensor, and wherein said altitude differentiating means comprises:
   signal conditioning means driven by said normal acceleration sensor to provide a conditioned signal, said conditioning means having a predetermined transfer characteristic; and
   additive means connected to said altitude responsive sensor and said signal conditioning means and responsive to the additive combination of the signals therefrom for driving said altitude differentiating means, said predetermined characteristic being dimensioned to produce from said altitude differentiating means a signal signifying the aircraft descent rate.

32. A control system for controlling an aircraft along a predetermined curvilinear descent path, said aircraft carrying first and second sensor means for providing signals corresponding to sensed conditions, said system comprising:
   longitudinal means connected to said first sensor means and responsive to the signal therefrom for providing a longitudinal signal related to the longitudinal velocity of said aircraft;
   height means connected to said longitudinal means and responsive to said longitudinal signal for producing a height signal which is a function of the descent rate required to follow said path; and
   command means connected to said second sensor means and said height means and responsive to signals therefrom for producing an error signal bearing a predetermined relation to the extent of deviation of said aircraft from said predetermined curvilinear descent path, said command means being operative to control said aircraft in response to said error signal.

33. A method for controlling an aircraft along a predetermined curvilinear descent path, said aircraft carrying altitude responsive and ground speed responsive sensors for providing signals corresponding to sensed conditions, said method comprising the steps of:
   measuring the output of said ground speed responsive sensor to derive a longitudinal signal related to longitudinal displacement of said aircraft;
   producing a height signal in response to said longitudinal signal, said height signal being functionally related to the altitude required to follow said path;
   producing an error signal in response to the deviation between said height signal and the output of said altitude responsive sensor; and
   controlling said aircraft in response to said error signal.

* * * * *